(12) United States Patent
Masuda

(10) Patent No.: US 6,904,808 B2
(45) Date of Patent: Jun. 14, 2005

(54) PRESSURE SENSOR AND METHOD FOR MANUFACTURING PRESSURE SENSOR

(75) Inventor: Takashi Masuda, Tokyo (JP)

(73) Assignee: Yamatake Corporation (JP)

( * ) Notice: Subject to any disclaimer, the term of this patent is extended or adjusted under 35 U.S.C. 154(b) by 2 days.

(21) Appl. No.: 10/381,800

(22) PCT Filed: Oct. 1, 2001

(86) PCT No.: PCT/JP01/08646

§ 371 (c)(1),
(2), (4) Date: Jul. 14, 2003

(87) PCT Pub. No.: WO02/27803

PCT Pub. Date: Apr. 4, 2002

(65) Prior Publication Data

US 2004/0007071 A1 Jan. 15, 2004

(30) Foreign Application Priority Data

Sep. 29, 2000 (JP) .......................................... 2000-298160

(51) Int. Cl.⁷ ................................................. G01L 9/12

(52) U.S. Cl. .......................... 73/718; 73/724; 361/283.1
(58) Field of Search .......................... 73/718, 716, 724; 361/283.1, 283.4

(56) References Cited

U.S. PATENT DOCUMENTS

| 5,349,492 | A  | * | 9/1994 | Kimura et al. ........... 361/283.4 |
| 5,801,313 | A  | * | 9/1998 | Horibata et al. .............. 73/718 |
| 6,167,761 | B1 | * | 1/2001 | Hanzawa et al. ............. 73/724 |
| 6,704,186 | B2 | * | 3/2004 | Ishikura .................. 361/283.1 |

* cited by examiner

Primary Examiner—William Oen
Assistant Examiner—Andre Allen
(74) Attorney, Agent, or Firm—Blakely Sokoloff Taylor & Zafman

(57) ABSTRACT

A cover plate (130) which is a plate member made of sapphire is joined to a pressure sensor chip (110), to which a buffer member (120) is fixed, by using a coating solution prepared by adding titanium dioxide to an aqueous solution of boehmite (AlO(OH)) which is a hydroxymineral of aluminum.

1 Claim, 4 Drawing Sheets

PRESSURE SENSOR AND METHOD FOR MANUFACTURING PRESSURE SENSOR

BACKGROUND ART

The present invention relates to a pressure sensor in which a pressure sensor chip made of α-phase aluminum oxide (alumina) such as sapphire is joined to a plate member also made of α-alumina such as sapphire, and a method for manufacturing the pressure sensor.

A capacitive pressure sensor chip is available, which detects a pressure by detecting an electrostatic capacitance. This pressure sensor chip has a housing comprised of a base with a predetermined space and a diaphragm arranged above the space of the base, a stationary electrode arranged in the base, and a movable electrode fixed to the diaphragm. In this chip, when the diaphragm deforms by receiving a pressure, a gap between the movable and stationary electrodes changes, thereby changing the electrostatic capacitance therebetween. A pressure received by the diaphragm can be measured on the basis of the change in electrostatic capacitance.

A pressure sensor chip having a housing comprised of a base and diaphragm made of sapphire is proposed. Sapphire, i.e., a corundum (a single crystal of α-phase aluminum oxide) has high thermal stability and can hardly dissolve in an acid and alkaline solution, so that it is widely used as a refractory material, insulator, abrasive, or the like. By using sapphire with the properties described above for the housing, even when an object to be measured is a corrosive fluid, the above-described pressure sensor chip can measure the pressure of the fluid by directly receiving it at the diaphragm.

The above-described pressure sensor chip is used as a pressure sensor by fixing to a pedestal, as shown in FIG. 10. As shown in FIG. 10, a pressure sensor chip 1001 is placed in a recess 1003 formed at a central portion of a pedestal 1002 made of, e.g., glass to face a diaphragm portion upward in FIG. 10. Terminals 1005 of electrode pins 1004 extending through the bottom surface of the pedestal 1002 are formed on the bottom surface of the recess 1003 of the pedestal 1002, which are respectively connected to the wires of electrodes led to the lower surface of the base of the chip 1001. A vent port 1006 communicating the bottom surface of the pedestal 1002 is formed in the bottom surface of the recess 1003.

A cover plate 1007 having an opening portion at the central portion presses the periphery of the upper surface of the chip 1001, thereby fixing it to the recess 1003. The cover plate 1007 is joined to the upper surface of the pedestal 1002 by using glass melted once and fixed to the pedestal 1002. The cover plate 1007 and chip 1001 are airtightly sealed with each other such that no fluid to be measured brought into contact with the upper surface of the chip 1001 enters the recess 1003 around the chip 1001.

To ensure pressure measurement accuracy, the cover plate 1007 is made of sapphire which is the same material as that of the chip 1001 to obtain the same degree of deformation, due to temperatures, as that of the chip 1001, such that no stress acts on the chip 1001. To airtightly seal the chip as described above by excluding dissimilar metal joint as much as possible, the abutting surfaces of the cover plate 1007 and chip 1001 are directly joined. To join the two members made of sapphire as described above, their joint surfaces are mirror-polished and abutted, and the two materials made of sapphire to be joined are heated while applying a pressure to a portion therebetween, thereby joining them strongly without using an adhesive or the like.

In the above-described direct joining, however, since the abutting surfaces of the two materials made of sapphire must be mirror-polished to a roughness of 0.3 nm or less, the expensive member (cover plate) is required. The above-described direct joining without an adhesive or the like generally increases the cost. In contrast, when a general adhesive is used, the two members are joined at a lower cost, thereby manufacturing an inexpensive pressure sensor. However, since the general adhesive is a different material interposed between the two members, a stress occurs, and the same corrosion resistance and thermal stability as in sapphire are not obtained at the joint portion. This restricts the applicable range of the pressure sensor.

As described above, to take full advantage of the material properties of the housing of the pressure sensor, direct joining is conventionally performed at a high cost between the respective members constituting the housing. In contrast, when the respective members are joined by using an adhesive or the like, the component is formed at a low cost, but the full advantage of the material properties of the member is not taken.

DISCLOSURE OF INVENTION

The present invention has been made to solve the above problem, and has as its object to form a pressure sensor, having a housing and the like made of α-phase aluminum oxide such as sapphire, at a low cost without degrading the properties of the material.

A pressure sensor according to an aspect of the present invention comprises a pressure sensor chip having a base made of α-phase aluminum oxide, a diaphragm made of α-phase aluminum oxide arranged on a major surface of the base, a capacitive chamber formed from a recess in the base and covered with the diaphragm, a stationary electrode arranged in a bottom portion of the capacitive chamber, and a movable electrode fixed to the diaphragm in the capacitive chamber to oppose the stationary electrode, and a plate member made of α-phase aluminum oxide which is connected to the pressure sensor chip through an intermediate product layer made of α-phase aluminum oxide, wherein the intermediate product layer is formed by heating a solution formed from a solution in which a compound containing aluminum and oxygen is dissolved to change the solution into an intermediate product made of amorphous aluminum oxide or aluminum oxide with a phase other than an α phase, and thereafter causing phase transition of the resultant intermediate aluminum oxide into α-phase aluminum oxide.

According to this pressure sensor, a joint portion between the pressure sensor chip and plate member is substantially made of α-phase aluminum oxide, e.g., sapphire which is the same material as that of the plate member.

In a method for manufacturing a pressure sensor according to another aspect of the present invention, in which a plate member made of α-phase aluminum oxide is joined to a pressure sensor chip having a base made of α-phase aluminum oxide, a diaphragm made of α-phase aluminum oxide arranged on a major surface of the base, a capacitive chamber formed from a recess in the base and covered with the diaphragm, a stationary electrode arranged in a bottom portion of the capacitive chamber, and a movable electrode fixed to the diaphragm in the capacitive chamber to oppose the stationary electrode, a solution layer formed from a solution in which a compound containing aluminum and oxygen is dissolved is formed on a surface of the plate member first, the solution layer is heated to form on the surface of the plate member an intermediate product layer made of amorphous aluminum oxide or aluminum oxide with a phase other than an α phase, the pressure sensor chip is arranged on the intermediate product layer, a pressure and an electric field are applied between the plate member and pressure sensor chip, the intermediate product layer is irradiated with ultraviolet rays, and the amorphous aluminum oxide or the aluminum oxide with a phase other than the α phase undergoes phase transition into α-phase aluminum oxide, thereby joining the plate member to the pressure sensor chip.

According to this manufacturing method, a joint portion between the pressure sensor chip and plate member is substantially made of α-phase aluminum oxide, e.g., sapphire.

In the above-described manufacturing method, the compound containing aluminum and oxygen includes an aluminum hydroxide, the solution layer includes an aqueous solution, and the compound containing aluminum and oxygen is, e.g., boehmite. In addition, the compound containing aluminum and oxygen may include an organometallic compound of aluminum and an organic salt of aluminum, e.g., $Al(CH_3COO)_3$. Further, the organometallic compound of aluminum may be aluminum alkoxide or aluminum metal carbonyl.

In the above-described manufacturing method, the wavelength of the ultraviolet rays may be not more than 200 nm.

In the above-described manufacturing method, a buffer member made of α-phase aluminum oxide is fixed on the peripheral portion of the diaphragm to form the pressure sensor chip, and the plate member may be joined to the buffer member.

In the above-described pressure sensor and the method for manufacturing the same, the α-phase aluminum oxide is sapphire, and the aluminum oxide with a phase other than the α phase is one material selected from the group consisting of γ-, θ-, ι-, κ-, ε-, χ-, δ-, and σ-phase aluminum oxides, and a compound thereof.

BEST MODE FOR CARRYING OUT THE INVENTION

Figure 1:
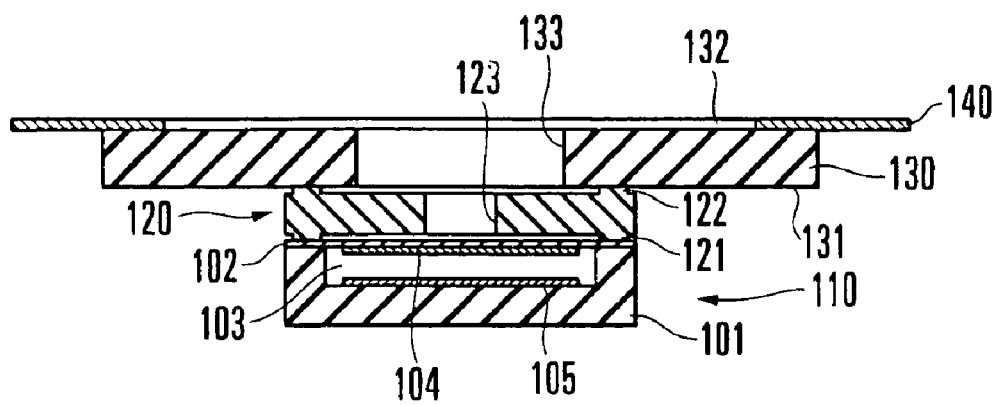
FIG. 1 is a view showing the structure in a state wherein a cover plate 130 is joined to a pressure sensor chip 110 according to embodiments of the present invention.

Embodiments of the present invention will be described below with reference to the accompanying drawings.
<First Embodiment>
FIG. 1 is a view showing the structure of a pressure sensor chip according to an embodiment of the present invention.

In this embodiment, as shown in FIG. 1, a cover plate (plate member made of α-phase aluminum oxide) 130 made of sapphire which is a single crystal of α-phase aluminum oxide (alumina) is joined to a pressure sensor chip 110 to which a buffer member 120 is fixed. The pressure sensor chip 110 to be joined to the cover plate 130 is formed from a sapphire base portion 101 and sapphire diaphragm 102. A recess formed at a central portion of the base portion 101 serves as a capacitive chamber 103. A movable electrode 104 is formed on the diaphragm 102 side in the capacitive chamber 103, and a stationary electrode 105 is formed on the base portion 101 side in the capacitive chamber 103, i.e., on the bottom surface of the recess of the base portion 101. Although not shown, electrode pads respectively connected to the movable electrode 104 and stationary electrode 105 are formed on the lower surface of the base portion 101.

Figure 2:
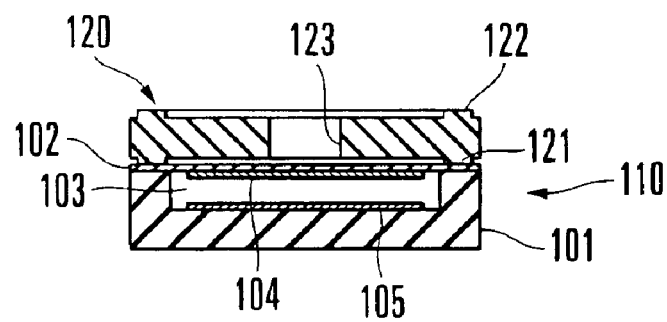
FIG. 2 is a view showing the structure of the pressure sensor chip 110 with a buffer member 120.

The chips 110 are formed by cutting a plurality of chips formed on a circular plate-like sapphire wafer with a diameter of, e.g., 4 inches. Before the wafer is cut into the chips 110, the sapphire wafer on which the plurality of chips 110 are formed and a circular plate-like sapphire wafer with a diameter of 4 inches, on which a plurality of buffer members are formed, are aligned with each other in their formation portions and directly joined, and the resultant wafers are cut at once, thereby obtaining each chip 110 to which a corresponding buffer member 120 is joined as shown in FIG. 2. Therefore, in other words, the chip 110 and buffer member 120 form one pressure sensor chip.

Figure 3:
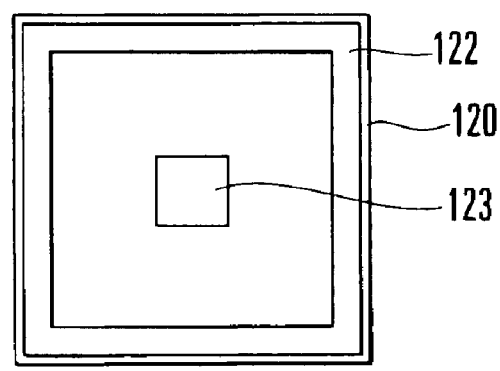
FIG. 3 is a plan view showing the structure of the buffer member 120.

As shown in FIG. 2 and FIG. 3 (plan view), ring-like contact regions 121 and 122 are respectively formed at portions near the terminal ends of the upper and lower surfaces of the buffer member 120, and the contact region 121 is directly joined to the upper surface of the diaphragm 102 of the base portion 101. An opening portion 123 is formed at the central portion of the buffer member 120. The buffer member 120 is used to relax a stress occurring when the cover plate 130 is joined and to prevent deformation of the very thin diaphragm 102. Accordingly, the buffer member 120 may not be used in a case wherein, e.g., no stress occurs in joining the diaphragm. When no buffer member 120 is used, the cover plate 130 (to be described rater) is joined to the upper surface of the diaphragm 102.

Figure 4:
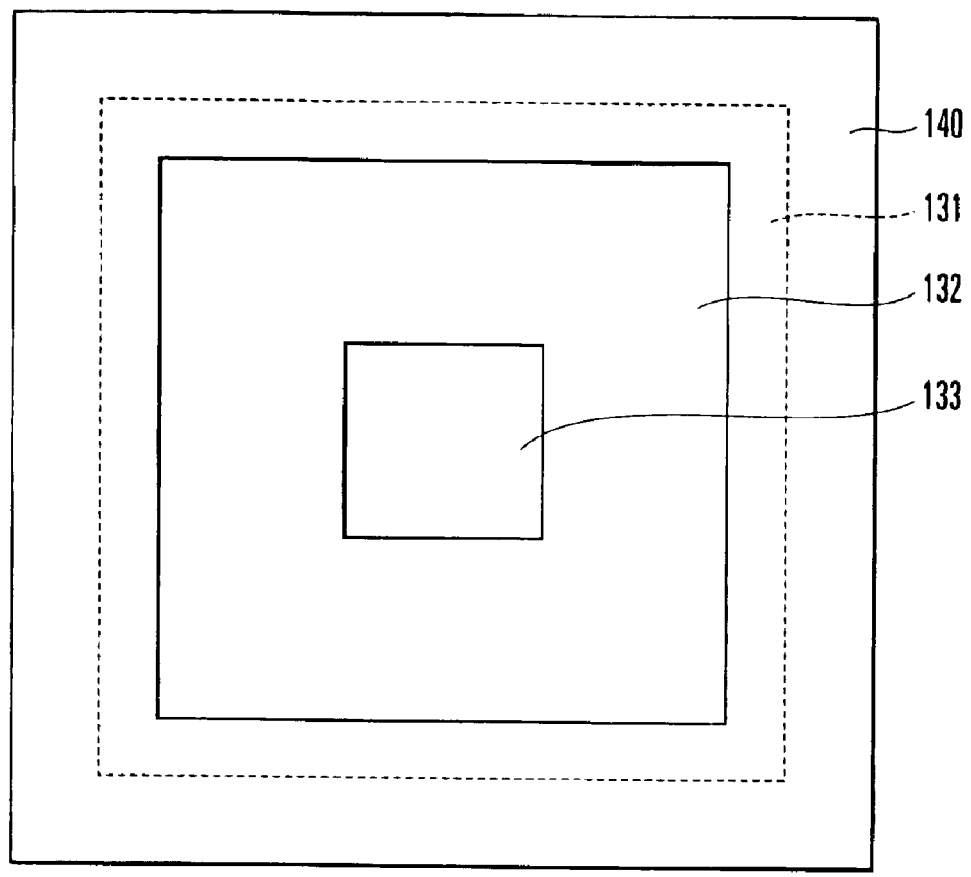
FIG. 4 is a plan view showing the structure of the cover plate 130 made of sapphire to which a metal plate 140 is joined.

While the chip 110 directly joined to the buffer member 120 is prepared, a sapphire cover plate 130 joined to a ring-like metal plate 140 as shown in the plan view of FIG. 4 is prepared. As shown in FIG. 4, the cover plate 130 is formed into a frame shape with an opening region 133 at the central portion, and the metal plate 140 is joined to the peripheral portion of a major surface 132 of the cover plate 130. The metal plate 140 is joined to the cover plate 130 as follows. First, a metal film is formed by, e.g., plating in the joint region of the cover plate 130 in advance, and the metal plate 140 is welded to the metal firm formation region.

As shown in FIG. 1, a lower surface 131 of the cover plate 130 is joined to the contact region 122 of the buffer member 120. In this embodiment, the cover plate 130 is joined in the following manner to manufacture the pressure sensor made of sapphire at a very lower cost than that in direct joining.

Figure 5:
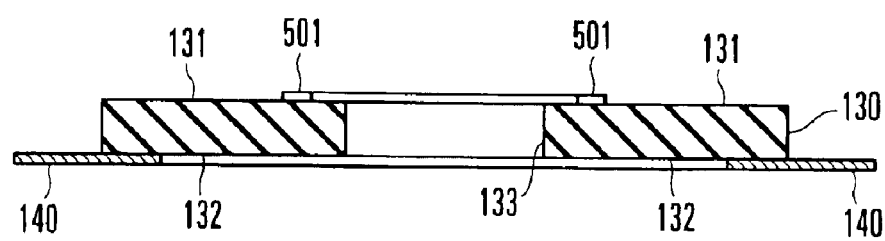
FIG. 5 is a process view for explaining a method for manufacturing the pressure sensor according to the embodiments of the present invention.

First, a coating solution is formed by adding titanium dioxide to an aqueous solution of boehmite (AlO(OH)) which is an aluminum hydroxide. As shown in FIG. 5, the surface of the cover plate 130 welded with the metal plate 140 is coated with the coating solution to form a coating film 501. When a small amount of diluted nitric acid is dissolved in the coating solution to set its hydrogen ion concentration (pH) to about 4, a stable dissolving state can be obtained even if boehmite has a high concentration.

Figure 6:
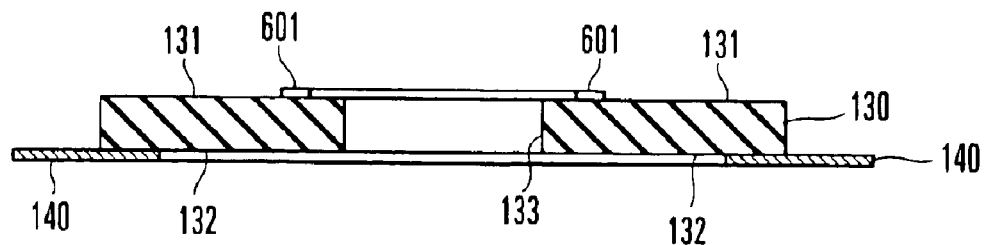
FIG. 6 is a process view for explaining the method for manufacturing the pressure sensor according to the embodiments of the present invention.

The cover plate 130 with the coating film 501 is heated to, e.g., 450° C. The water content is evaporated by heating, and the coating film made of the aqueous solution of boehmite is changed into a gel film. When the boehmite gel on the cover plate 130 is further heated, it changes into γ-alumina by dehydration and joins to the cover plate 130 made of sapphire. As a result, as shown in FIG. 6, an intermediate product layer 601 made of γ-alumina or amorphous alumina is formed in the joint region on the surface of the cover plate 130, which joins thereto. Since the intermediate product layer 601 is formed by applying the aqueous solution of boehmite, the surface of the intermediate product layer 601 absorbs unevenness on the upper surface of the cover plate 130 to make it flat. This flat state allows direct joining when the intermediate product layer 601 is made of sapphire.

In a corundum crystal structure (α phase), alumina has a very stable state as a corundum such as sapphire. In contrast, a cubic spinel crystal structure of γ-alumina has a large number of lattice defects generated by oxygen atom omissions due to an unnatural crystal structure. In addition, amorphous alumina has a larger number of lattice defects than that of γ-alumina. When a layer having the large number of above-described lattice defects generated by oxygen atom omissions is formed on sapphire, oxygen contained in sapphire on the surface of sapphire enters the lattice defects to attain a stable state. With this reaction, the cover plate 130 made of sapphire and the intermediate product layer 601 formed on the surface of the cover plate 130 are chemically bonded and joined.

Figure 7:
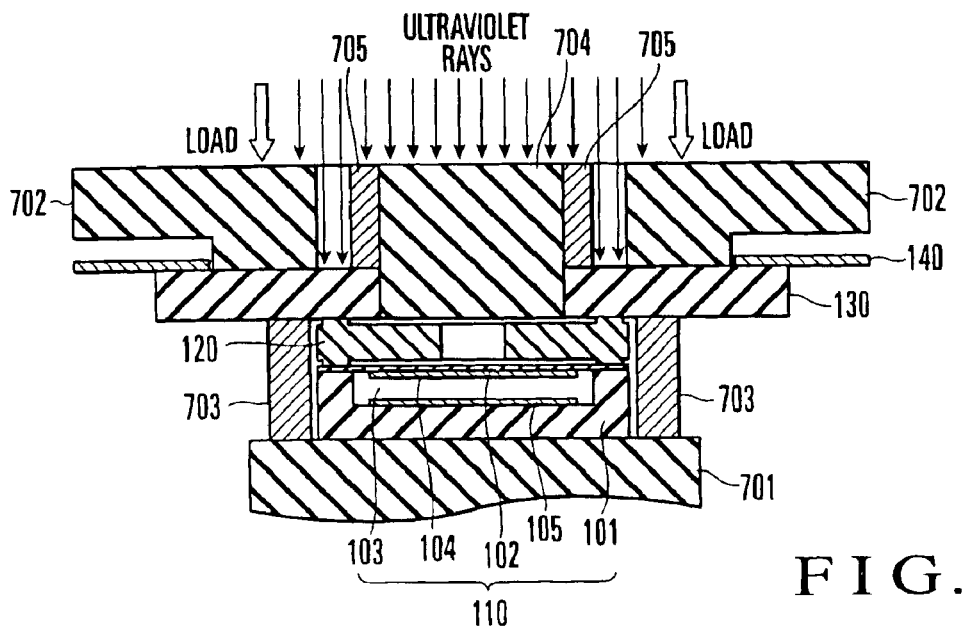
FIG. 7 is a view showing part of the structure of the pressure sensor according to the embodiments of the present invention.

Subsequently, the surface of the intermediate product layer 601 on the cover plate 130 abuts against the surface of the contact region 122 of the buffer member 120, and in this state, as shown in FIG. 7, a pressure of, e.g., 100 to 30,000 Pa and preferably 2,000 Pa is applied between the chip 110 and cover plate 130 to apply a load on them. In addition, the intermediate product layer 601 receives an electric field of about 5 kV/mm and is irradiated with ultraviolet rays (185 nm). Further, the chip 110 and cover plate 130 are heated to about 700° C.

The load application, electric field application, and ultraviolet ray irradiation are performed as shown in FIG. 7. As shown in FIG. 7, the chip 110 to which the buffer member 120 is joined is placed on a surface plate 701 made of a ceramic such as alumina, and the cover plate 130 is placed on the buffer member 120. A pressure frame 702 is placed on the cover plate 130 to apply a load of the weight (about 200 kg) of the pressure frame 702 to the cover plate 130. Although not shown, the intermediate product layer is formed between the cover plate 130 and buffer member 120.

A lower electrode 703 is arranged on the surface plate 701 so as to surround the chip 110 to which the buffer member 120 is joined. A shielding member 704 is fitted in the opening region of the cover plate 130, and a frame-like upper electrode 705 arranged around the shielding member 704 is arranged on the end of the cover plate 130 on the opening region side. In this case, a gap is formed between the inner side of the pressure frame 702 and the outer side of the upper electrode 705, through which the joint region of the cover plate 130 and buffer member 120 is seen from above.

After the above layout, a vacuum or decompression atmosphere is set. The cover plate 130 is irradiated with ultraviolet rays from above the pressure frame 702, a voltage is applied between the lower and upper electrodes 703 and 705, and a heat-transfer heater (not shown) incorporated in the surface plate 701 is energized to generate heat for heating the whole structure.

In this manner, the intermediate product layer 601 shown in FIG. 6 undergoes phase transition to an α phase and changes into a corundum, i.e., sapphire. The cover plate 130 and buffer member 120 are seamlessly and strongly joined by the layers made of sapphire which is the same material as in the cover plate 130 and buffer member 120.

This joining operation will be considered. The above-described γ-alumina is heated to about 1,000° C. and undergoes phase transition from the cubic spinel crystal structure to a corundum crystal structure, thereby changing γ-alumina into a corundum. To greatly change the crystal structure in this phase transition, atoms must greatly move and, some bonds between, e.g., aluminum and oxygen must be broken from each other. Thus, the phase transition from γ-alumina to α-alumina requires a high temperature of 1,000° C., as described above.

In this case, the bond between aluminum and oxygen tends to be broken at a lower temperature (to be described later) by adding titanium dioxide to the intermediate product layer in advance, and applying the electric field and irradiating the intermediate product layer with ultraviolet rays, as described above. This may allow to increase each atom mobility.

In titanium dioxide added to the intermediate product layer, hole-electron pairs are generated by irradiating the intermediate product layer with ultraviolet rays. In addition, since an electric field is applied to the intermediate product layer, the generated hole-electron pairs are broken, and the resultant holes and electrodes are not re-combined.

When titanium dioxide in the above-described state is present near an anode, the titanium dioxide receives electrons from the anode and becomes an electron rich state. To eliminate this electron rich state, titanium dioxide emits electrons to neighboring aluminum-oxygen bonds. Each aluminum-electron bond in γ-alumina is generally broken around a high temperature of 1,000° C. However, the bond is broken at a temperature lower than 1,000° C. by receiving an electron attack from titanium oxide.

As a result, each aluminum-oxygen bond receiving an emitted electron is broken at about 700° C. to generate $O^{2-}$, thereby generating an oxygen defect in which no oxygen atom is present at a position where it should be.

Titanium dioxide in the above-described state, which is present near a cathode, be in an electron deficient state because electrons are removed by the cathode. Each separate $O^{2-}$ transfers electrons to neighboring titanium dioxide in the electron deficient state and combines to a neighboring oxygen defect. This is not limited to titanium dioxide, and the same result is obtained by using any other photocatalyst such as $ZnO_2$.

With the above operation, the intermediate product layer 601 can undergo phase transition to a corundum in heating at about 700° C. by adding titanium dioxide in advance, applying an electric field, and irradiating the intermediate product layer with ultraviolet rays. In this embodiment, since the joining process of the cover plate 130 is a process at the highest temperature, the movable and stationary electrodes 104 and 105 formed in the chip 110 are preferably made of a conductive member such as a metal resistant to 700° C. Note that a predetermined pressure is applied between the substrates to apply a load to them, so that the cover plate 130 is prevented from warping, and the joint surfaces of the cover plate 130 and the contact region 122 of the buffer member 120 entirely come into contact with each other.

Figure 8:
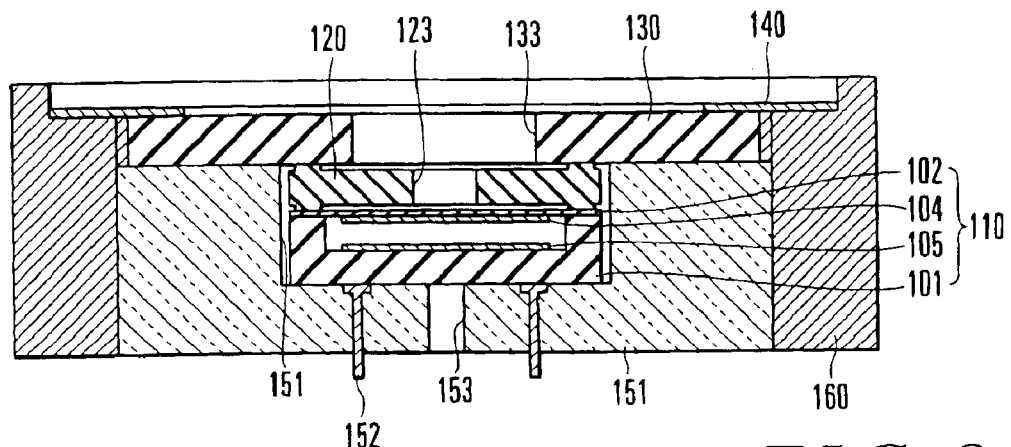
FIG. 8 is a view showing part of the structure of the pressure sensor according to the embodiments of the present invention.

As shown in FIG. 8, a base 150 made of glass and having a recess 151 at the central portion is prepared. The chip 110 to which the cover plate 130 is attached together with the metal plate 140 through the buffer member 120 is fixed in the recess 151 of the base 150. The base 150 has electrode pins 152 whose upper ends are exposed at the bottom portion of the recess 151 and whose lower ends extending through the bottom portion of the base 150 project from the bottom surface of the base 150. A vent port 153 extending through the lower portion of the base 150 is formed in the bottom portion of the recess 151. In addition, a metal frame 160 is fixed to the base 150 so as to surround it.

When the chip 110, therefore, is to be fixed in the recess 151, the electrode pads (not shown) exposed on the lower surface of the chip 110 are aligned to the upper ends of the corresponding electrode pins 142 to bring them into contact with each other.

The chip 110 is fixed by welding the metal plate 140 to the upper surface of the frame 160.

With the above operation, the upper surface, i.e., the pressure receiving surface of the diaphragm 102 of the chip 110 is exposed in a region above the drawing surface of FIG. 8 through the opening portion 123 of the buffer member 120 and the opening region 133 of the cover plate 130. Thus, a fluid in the region above the drawing surface of FIG. 8, which region is partitioned by the base 150 and frame 160, is in direct contact with the pressure receiving surface of the chip 110.

Since, however, the frame 160 and metal plate 140, the metal plate 140 and cover plate 130, the cover plate 130 and buffer member 120, and the buffer member 120 and diaphragm 102 are tightly joined to each other, no fluid in direct contact with the pressure receiving surface of the chip 110 leaks to a region below the drawing surface of FIG. 8, which region is partitioned by the base 150 and frame 160.

In this embodiment, the joint surface roughness of the cover plate is set to about, e.g., 10 nm as long as, in forming the intermediate product layer by applying the solution, the surface of the intermediate product layer absorbs the surface roughness of a sapphire substrate to make it flat. A sapphire substrate with a surface roughness of about 10 nm has been used for, e.g., a wristwatch window, and is as inexpensive as several hundred yen in this size. A substrate with the same size as described above and a surface roughness of 0.3 nm or less, which is processed for direct joining, is several ten thousand yen, but such a high-accuracy substrate is not required in this embodiment.

As described above, according to this embodiment, a cover plate made of sapphire can be joined to the same degree as in direct joining while eliminating the highly accurate process which increases the cost. In this case, the buffer member and cover plate or the chip and cover plate are joined to each other through the intermediate product layer made of sapphire ($\alpha$-phase aluminum oxide) which is substantially the same material as in the chip and cover plate.

In the above description, boehmite is used. This material is one form of an aluminum hydroxide. Any other aluminum hydroxide such as gibbsite or diaspore is used to obtain the same result as described above.

<Second Embodiment>

Another embodiment according to the present invention will be described next.

In this embodiment, an intermediate product layer 601 (FIG. 6) to be formed on a cover plate 130 made of sapphire is formed in the following manner.

First, an aqueous solution of aluminum nitrate is applied to a predetermined region (joint region) of the cover plate 130 and heated, thereby forming the intermediate product layer 601 made of $\gamma$-alumina on the cover plate 130 in the coating region. The water content of the aqueous solution of aluminum nitrate is evaporated by heating, and the aluminum nitrate is changed to a basic salt by losing nitric acid and finally changes into $\gamma$-phase aluminum oxide ($\gamma$-alumina). As a result, like the above-described embodiment, the intermediate product layer 601 made of $\gamma$-alumina is formed on the cover plate 130. The following process is the same as in the above-described embodiment.

In this embodiment, the cover plate is coated with the aqueous solution of aluminum nitrate. However, an aqueous solution of a strong acid or strong alkali may be applied to a cover plate and heated to cause a chemical reaction in sapphire itself on the surface of the cover plate, thereby forming an aluminum nitrate layer on the surface of the cover plate.

<Third Embodiment>

Still another embodiment according to the present invention will be described next.

In this embodiment, a cover plate 130 is coated with the organic solvent of an organometallic compound of aluminum, and an intermediate product layer 601 (FIG. 6) made of $\gamma$-alumina is formed on the cover plate 130 by heating it to about 200 to 600° C. As the organometallic compound of aluminum, ethyl acetoacetate aluminum diisopropylate, aluminum isopropylate, or the like may be used.

When a coating film formed from the organic solvent of an organometallic compound of aluminum is heated, the organic solvent is evaporated. Thereafter, when the film is heated to the temperature described above, the organometallic compound decomposes to vaporize an organic component, so that any aluminum oxide other than $\alpha$-phase aluminum oxide, i.e., amorphous aluminum oxide, $\gamma$-phase aluminum oxide, or the like remains. This decomposition can be executed at a lower temperature by irradiating the film with ultraviolet rays or by performing decomposition in an oxygen plasma. As a result, like the above-described embodiments, the intermediate product layer 601 made of amorphous alumina or $\gamma$-alumina is formed on the cover plate 130. The following process is the same as in the above-described embodiment.

Figure 9:
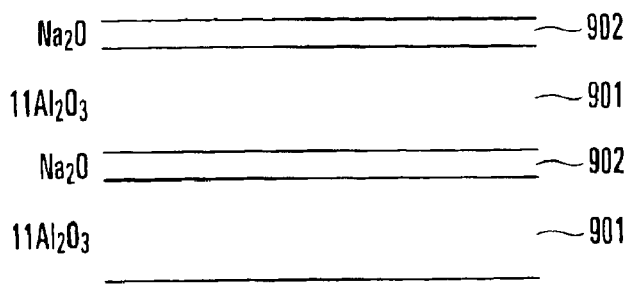
FIG. 9 is an explanatory view showing a β-alumina state.
Figure 10:
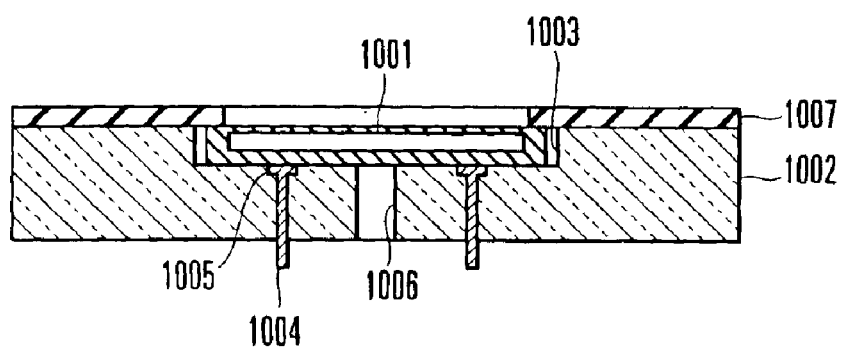
FIG. 10 is a view showing part of the structure of a pressure sensor.

In this embodiment, a metal is used for each electrode formed in the chip which is a pressure sensor for pressure measurement. However, the present invention is not limited to this, and a material to be called $\beta$-alumina such as $Na_2O.11Al_2O_3$ or $K_2O.11Al_2O_3$ may be used. As shown in FIG. 9, $\beta$-alumina has a structure in which an $Al_2O_3$ layer 901 formed from 11 $Al_2O_3$ molecular layers and an $Na_2O$ layer 902 formed from one $Na_2O$ molecular layer are alternately stacked. $\beta$-alumina with this structure is conductive and has a good affinity with sapphire serving as the electrode formation matrix, so that electrode peeling due to a thermal stress in the pressure sensor manufacturing process and a diaphragm deformation stress acting in pressure measurement is suppressed.

Since $\beta$-alumina is a refractory material with a high melting point of 2,900° C., no problem occurs even in the cover plate joining process described above. Processing at a higher temperature can be performed in the cover plate joining process, thereby executing more rapid and reliable phase transition in the intermediate product layer made of amorphous alumina or $\gamma$-alumina.

Note that sapphire is used in the above description, but the present invention is not limited to this. Any members made of $\alpha$-phase aluminum oxide may be joined in the same manner as described above.

As described above, according to the embodiment described above, a plate member made of $\alpha$-phase aluminum oxide such as sapphire can be joined, to the same joining degree as in direct joining, to a pressure sensor chip having members, e.g., a housing, made of $\alpha$-phase aluminum oxide such as sapphire. This makes it possible to form a pressure sensor made of sapphire at a low cost without degrading the properties of sapphire.

As has been described above, in a pressure sensor and a method for manufacturing a pressure sensor according to the present invention, a plate member made of $\alpha$-phase aluminum oxide such as sapphire can be joined, to the same joining degree as in direct joining, to a pressure sensor chip having members, e.g., a housing, made of $\alpha$-phase aluminum oxide such as sapphire. Therefore, the present invention is suited to forming a pressure sensor made of sapphire at a low cost without degrading the properties of sapphire.

What is claimed is:

1. A pressure sensor characterized by comprising:
   a pressure sensor chip having a base made of $\alpha$-phase aluminum oxide, a diaphragm made of $\alpha$-phase aluminum oxide arranged on a major surface of said base, a capacitive chamber formed from a recess in said base and covered with said diaphragm, a stationary electrode arranged in a bottom portion of said capacitive chamber, and a movable electrode fixed to said diaphragm in said capacitive chamber to oppose said stationary electrode; and a plate member made of $\alpha$-phase aluminum oxide which is connected to said pressure sensor chip through an intermediate product layer made of $\alpha$-phase aluminum oxide, wherein said intermediate product layer is formed by heating a solution formed from a solution in which a compound containing aluminum and oxygen is dissolved to change the solution into an intermediate product made of amorphous aluminum oxide or aluminum oxide with a phase other than an $\alpha$ phase, and thereafter causing phase transition of the resultant intermediate aluminum oxide into $\alpha$-phase aluminum oxide.

* * * * *